July 24, 1928.
D. T. PHILLIPS
WHEEL
Filed May 28, 1926        2 Sheets-Sheet 1
1,678,530
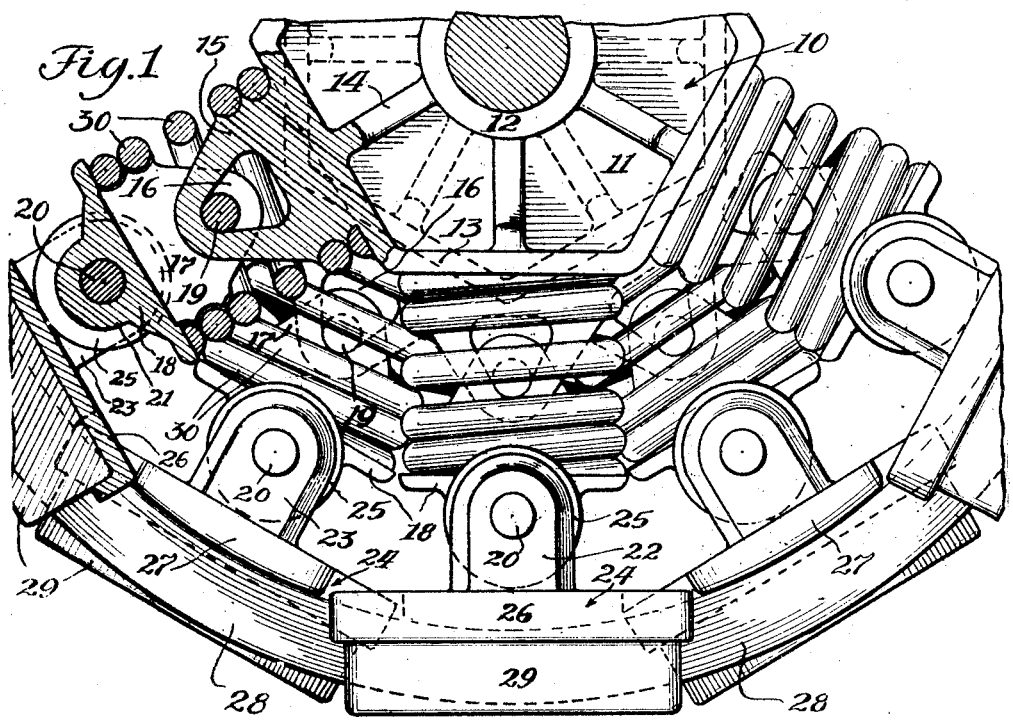
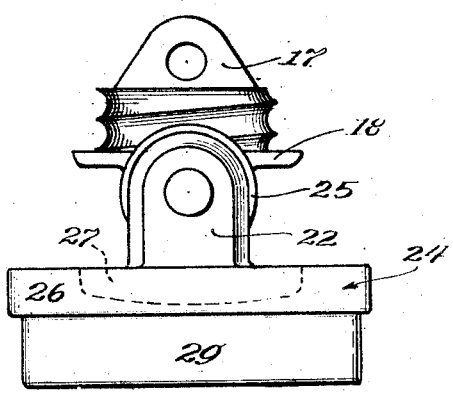
Inventor
Darius T. Phillips
by Banning Banning Attys July 24, 1928.

D. T. PHILLIPS

WHEEL

Filed May 28, 1926

Inventor
Darius T. Phillips
by Banning & Banning
Atty's.

Patented July 24, 1928.

1,678,530

UNITED STATES PATENT OFFICE.

DARIUS T. PHILLIPS, OF CHICAGO, ILLINOIS.

WHEEL.

Application filed May 28, 1926. Serial No. 112,192.

The wheel of the present invention is of that type which employs individually mounted tread sections adapted to contact the ground, and the object of the present invention is to combine a continuous tire with such tread sections in such a way that it will not only serve to hold the tread sections against rattling or vibration when in use, but will also supplement the tread surface in affording an additional area of ground contact.

The invention further relates to the means provided for so configuring and mounting the tread sections that the mountings therefor will subserve the purpose of affording a mounting for the tire, so that the structure as a whole will be properly unified and combined.

Further objects and details will appear from a description of the invention in conjunction with the accompanying drawings wherein—

Figure 1 is a side elevation of a portion of a wheel, partly in section, which employs the features of the present invention;

Fig. 2 is a side elevation of one of the treads with the mounting therefor;

Figure 3:
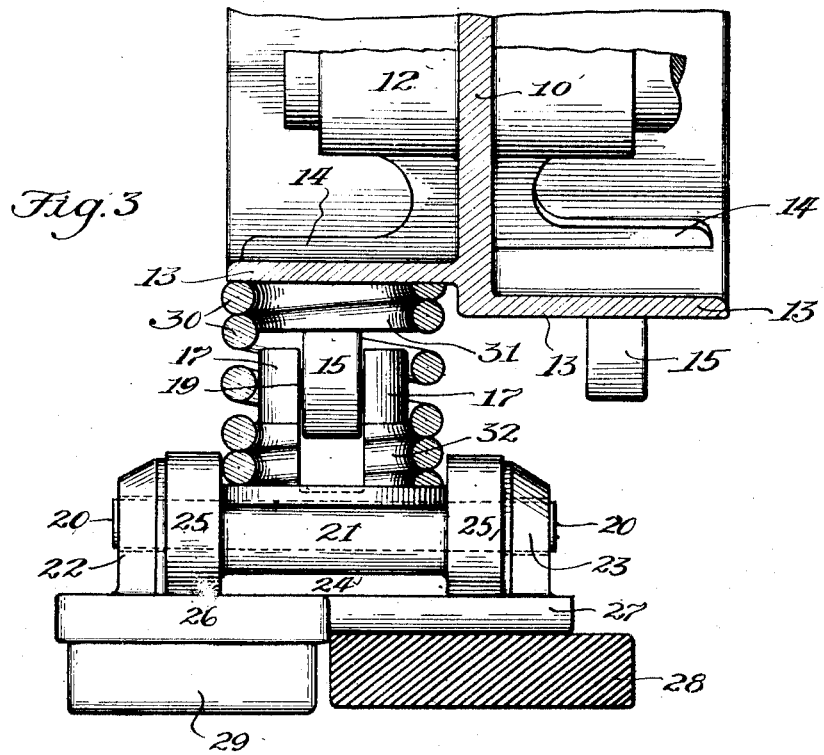
Fig. 3 is a cross sectional elevation through a portion of the wheel, showing one of the treads and mountings in elevation.
Figure 4:
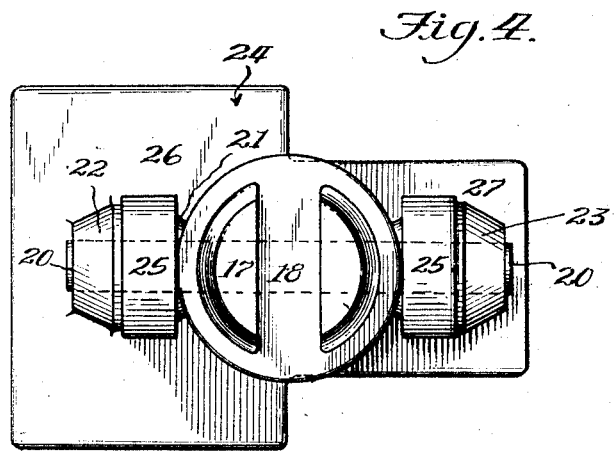
Fig. 4 is a plan view of one of the tread mountings and associated parts.

The wheel as a whole is built upon a hub 10 which, as shown, is in the form of a double hexagon comprising a center web 11 extending radially from a center sleeve or journal mounting 12, which web merges into a pair of oppositely extending peripheral flanges 13—13, each of hexagonal shape and arranged in staggered relation to one another in such a way as to bring the corners of one hexagon into registry with the flat sides of the other, as best indicated in Fig. 1.

In order to reinforce the flat sides, a plurality of radially extending ribs 14 are provided, which merge into the centers of the flat sides of the hexagon on each side of the double faced hub. Each of the flat sides is provided in its center with an outstanding tongue or lug 15, which is preferably cast onto the outer flat side of the hub and is provided with an aperture 16 of triangular shape with its apex extending outwardly to bring its greatest circumferential dimension at the inner side of the aperture.

Each of the tongues 15 has its outer end entered between a pair of ears 17 extending inwardly from an intermediate bracket mounting 18, a cross pin 19 being provided to freely connect the parts together in such a way as to permit the bracket mounting to move inwardly in a radial direction toward the center of the wheel, and when so moved will have considerable freedom of motion in a circumferential direction by reason of the configuration of the aperture 16.

The bracket mounting 18 serves as a connection for the tread mounting, which is pivoted to the bracket mounting by means of a pivot pin 20 which is entered through an elongated tubular boss 21 on the outer face of the bracket mounting, and through outer and inner lugs 22 and 23 which extend inwardly from the inner face of a tread mounting plate 24. The ends of the tubular boss 21 merge into a pair of enlarged drum shaped heads 25, which respectively abut against the outer and inner lugs 22 and 23 which are concentric with the axis of the pivot pin 20, so as to permit the tread mounting to roll around the peripheries of the drum shaped heads as the treads rock back and forth during the operation of the wheel.

Each of the tread mountings 24 is in the form of a T-shaped plate comprising a recessed tread carrier 26 of rectangular shape and an inwardly projecting extension 27, constituting a shoe for the contact of the circumferentially extending continuous tire 28. The recessed tread carrier affords a mounting for a rectangular tread 29 which is preferably formed of rubber or the like, and which, as shown, projects slightly beyond the outer face of the continuous tire, which is likewise formed of rubber or similar material. The rear or inner face of the tread mounting is plane or flush, but the outer or acting face of the shoe extension 27 is rounded to conform to the curvature of the continuous tire 28, which bears firmly upon the shoe extensions of the entire series of treads, which thus furnish a mounting for the tire to hold the same in the medial position between the treads on opposite sides of the wheel.

In order to hold the treads in outwardly projected position and to afford the desired amount of resiliency in the structure of the wheel, each of the tread mountings is encircled by a coil spring 30, the ends of which bear respectively against the flat faced hub and the intermediate bracket mounting. The convolutions of the spring coil thus encircle the tongue 15 and the ears 17, and in order to afford a firm mounting for the inner and outer ends of the spring, the portions of the structure contiguous thereto are provided with spiral grooves 31 and 32, as best indicated in Fig. 3.

In view of the fact that the hub is in the form of two oppositely facing hexagons, the treads will be arranged in the form of two staggered series extending circumferentially around the wheel and in overlapping relation to one another. This arrangement of the treads causes the shoe mountings for the tire to extend inwardly in alternation from the opposite sides of the wheel, but out of contact with one another, so that the necessary freedom of swinging movement will be afforded to the individual treads without interference, and, at the same time, the entire series of shoes will afford substantial continuity of mounting for the tire which will occupy a position intermediate the lines of overlapping treads on opposite sides of the wheel.

In use, the tire will serve to frictionally hold the treads against free or unimpeded movement, so that there will be no tendency for the treads to swing idly or rattle, and, at the same time, the arrangement is one which will permit the individual treads to adapt themselves to the ground contour without impediment. When the wheel is rotating, the successive treads will swing into flatwise contact with the ground, and when this position is attained, the ground pressure will tend to hold the tread against movement or slipping, and the superposed weight will cause a commensurate compression of the spring.

This will move the pin 19 inwardly toward the circumferentially elongated portion of the aperture 16, so that there will thereupon develop a tendency for the wheel to roll forward slightly without momentarily moving the tread or disturbing the ground contact maintained thereby, and this independence of movement will continue until the oncoming end of the aperture will engage the pin and carry the tread backwardly with the rotation of the wheel. The rotation of the wheel thus develops a four fold movement in each of the treads, that is to say, a bodily rotating movement of the tread with the wheel, a swinging movement of the tread to bring it into flatwise contact with the ground, a compressive radial movement of the tread, and a slipping movement of the wheel beyond the tread occasioned by the pin and slot connection in the tread mounting.

The compressive movement occasioned by the superposed weight will tend to bring the continuous tire into contact with the ground, so that the tread contact will be supplemented by the tire contact, which latter will gauge or restrict the inner compressive movement imparted to the treads, which latter, however, is of a character better adapted to resist slippage under adverse conditions than the smooth contact afforded by the tire.

By combining the tire with the treads, the tread movements will be better regulated, in that excessive freedom of movement will be prevented and, at the same time, any jolting or jarring which might be occasioned by the intermittent contact of the treads with the ground will be avoided by the provision of the continuous tire surface which will thus serve to stabilize and equalize the rolling action of the wheel as a whole. Furthermore, when operating in comparatively soft ground, the continuous tire will afford a supplemental area which will tend to prevent excessive sinking or embedment in the ground, and this area in conjunction with the effective tractive effort of the treads will afford a high efficiency to the wheel.

Although the wheel has been described with particularity as to detail, it is not the intention to limit the invention to the precise arrangement shown, since the mountings for the treads might be otherwise arranged without departing from the spirit of the invention.

I claim:

1. In a wheel, the combination of a hub portion, a series of tread members circumferentially arranged around the hub, mountings for pivotally connecting said tread members with said hub portion, and a continuous tire carried by said tread mountings and lying in laterally adjacent relation to said tread members and supplementing the ground contact afforded thereby, substantially as described.

2. In a wheel, the combination of a hub portion, a series of tread members circumferentially arranged around the hub, spring backed mountings for pivotally connecting said tread members with said hub portion, and a continuous tire carried by said tread mountings and lying in laterally adjacent relation to said tread members and supplementing the ground contact afforded thereby, substantially as described.

3. In a wheel, the combination of a hub portion, two series of tread members, arranged in parallel rows around the hub, mountings for said tread members, and a continuous tire lying between said rows of tread members and supported upon the mountings for the tread members, substantially as described.

4. In a wheel, the combination of a hub, two rows of tread members arranged in parallel relation around the hub, yieldably supported and pivotally connected mountings for connecting said tread members to said hub, and a continuous tire carried by said mountings and lying intermediate the rows of tread members, substantially as described.

5. In a wheel, the combination of a hub, two rows of tread members arranged in parallel relation to one another around said hub, the individual tread members in the two rows being in staggered relation with respect to one another, mountings for connecting said tread members to said hub, each of said mountings having an inwardly projecting shoe portion, and a continuous tire carried by said shoe portions and lying intermediate the rows of treads, substantially as described.

6. In a wheel, the combination of a double faced hub, each face being of polygonal formation and the flat sides of the respective faces being in staggered relation to one another, a tongue extending outwardly from each of the flat faces and provided with an inwardly enlarging slot, a connecting bracket associated with each of said tongues and connected thereto by a pin entered through said slot to permit a predetermined degree of movement between said tongue and bracket, a spring interposed between the hub and each of said brackets, a tread mounting pivoted to each of said brackets, each tread mounting having an inwardly projecting shoe portion, a continuous tire carried by said shoe portions, and a tread carried by each of the tread mountings in position to co-act with the surface of the tire in affording an area of ground contact, substantially as described.

7. In a wheel, the combination of a hub provided with two rows of slotted elements, the slots in the respective rows being in staggered relation to one another, each of the slots being of triangular formation with its greatest circumferential dimension toward the center of the wheel, two rows of brackets associated with said slotted members, said brackets being connected thereto by pins affording a capacity for movement in a radial and in a circumferential direction, springs interposed between said brackets and said slotted members, tread mountings pivoted to the brackets, each mounting being provided with an inwardly extending shoe portion, a continuous tire carried by said shoe portions, and treads carried by said tread mountings and disposed on opposite sides of said tire, substantially as described.

8. In a wheel, the combination of a hub portion, a series of tread members circumferentially arranged around the hub, mountings for resiliently connecting said tread members with said hub portion, and a continuous tire carried by said tread mountings and lying in laterally adjacent relation to said tread members and supplementing the ground contact afforded thereby, substantially as described.

9. In a wheel, the combination of a hub portion, a series of tread members circumferentially arranged around the hub, mountings for pivotally connecting said tread members with said hub, said mountings lying in close adjacent endwise relation to one another, and a continuous tire carried by said tread mountings and lying in laterally adjacent relation to said tread members and supplementing the ground contact afforded thereby, substantially as described.

10. In a wheel, the combination of a hub portion, a series of tread members circumferentially arranged around the hub, mountings for resiliently connecting said tread members with said hub, said mountings lying in close adjacent endwise relation to one another, and a continuous tire carried by said tread mountings and lying in laterally adjacent relation to said tread members and supplementing the ground contact afforded thereby, substantially as described.

11. In a wheel, the combination of a hub portion, a series of tread members circumferentially arranged around the hub, mountings for pivotally and resiliently connecting said tread members with said hub, said mountings lying in close adjacent endwise relation to one another, and a continuous tire carried by said tread mountings and lying in laterally adjacent relation to said tread members and supplementing the ground contact afforded thereby, substantially as described.

12. In a wheel, the combination of a hub provided with two rows of slotted elements, the slots in the respective rows being in staggered relation to one another, each of the slots being of triangular formation with its greatest circumferential dimension toward the center of the wheel, two rows of brackets associated with said slotted members, said brackets being connected thereto by pins affording a capacity for movement in a radial and in a circumferential direction, springs interposed between said brackets and said slotted members, tread mountings pivoted to the brackets, each mounting being provided with an inwardly extending shoe portion, a continuous tire carried by said shoe portions, and treads carried by said tread mountings and disposed on opposite sides of said tire, and in staggered relation to one another, the tread surfaces protruding slightly beyond the adjacent portion of the tire surface, substantially as described.

DARIUS T. PHILLIPS.